Patented Dec. 15, 1953

2,662,809

UNITED STATES PATENT OFFICE 2,662,809

METHOD OF RECOVERING LITHIUM COMPOUNDS FROM LITHIUM MINERALS

Adolphe Victor Kroll, Grevenmacher-Pieter, Luxemburg, assignor, by mesne assignments, to Compagnie Geologique et Miniere des Ingenieurs et Industriels Belges "Geomines" Societe par Actions a Responsabilite Limitee, Manono, Belgian-Congo, a company of Belgian-Congo No Drawing. Application May 1, 1950,
Serial No. 159,390

Claims priority, application Belgium May 7, 1949

9 Claims. (Cl. 23—30)

It is known that among the lithium ores, those containing the mineral spodumen, i. e. metasilicate of aluminum and lithium, have the lowest solubility, especially when the spodumen is of great purity.

An object of the present invention is to increase the solubility of such spodumen minerals and conduct an efficient extraction of the ore so as to recover a soluble lithium salt content therefrom by combining the features of increasing the solubility with leaching by means of an appropriate aqueous solvent.

The spodumen ore is firstly calcined in admixture with a small amount of alkali-metal or alkaline earth metal oxides, hydroxides or salts forming these oxides during calcination. The calcination brings about a chemical reaction of the mixture, and it is a feature of the invention, that the addition of the oxide material is too small to bring about a sufficient solubility of the calcined product in pure water to readily leach lithium salts thereby as is necessary in industrial application. It is necessary to use an aqueous solvent to leach the calcined product which has not been chemically saturated with the oxide material. The leaching solvent may be a mineral acid such as an aqueous hydrochloric acid but preferably an electrolyte is used, such as an aqueous solution of salts ionized by electrolytical disassociation producing anions of acidic radical, such as the salts of alkali- or alkaline earth metals which may be of acid, neutral or alkaline character and the operation is preferably performed at a temperature over 100° under superatmospheric pressure.

By calcination of the oxide mixture the natural molecular constitution of the spodumen is altered by chemical reaction to enable the acidic anions of the aqueous electrolyte solution to react promptly and completely upon the calcined product to produce soluble lithium salts by a new chemical equilibrium.

The aqueous electrolyte solution may contain hydrochloric acid or such salts as sodium chloride, sodium sulphate, sodium or calcium nitrate. The anions are respectively $Cl^-$, $SO_4^{--}$, $NO_3^-$. They are of two kinds: The halogen anions and the anions yielding oxy salts.

Thus, the new process consists of mixing the lithium ore in a pulverized state with an oxide such as may be chosen from the group of alkali metal oxides or hydroxides, alkaline earth metal oxides, or hydroxides, and nitrates or carbonates of these which are present in the mixture in an amount insufficient to completely react with all of the silicate present in the ore and insufficient to make the calcined lithium-containing product industrially soluble in water (which is equivalent to the formation of an orthosilicate of chalk by saturation). The chemical reaction of the constituents of the mixture is carried out by calcination at a temperature which is sufficiently high to at least partially fuse (sinter) the mixture and, to bring the calcined products preferably in form of a pulp in contact with an aqueous ionized solution containing anions of an acid radical in a quantity sufficient to bring about an extraction of lithium compounds from the mineral, with surprisingly high yields.

An example of an effective addition of an oxide material to the lithium ore before calcination is the admixture of 5% quick lime to natural spodumen and this amount is sufficient to allow an easy decomposition of the calcined material by leaching with an aqueous salt solution.

A second example of an even easier decomposition is given by the admixture of 25% of quick lime to the spodumen before calcination. These examples do not set limits. Indeed smaller or larger additions influence the ease of decomposition of the calcined material, in accordance with variations in the starting ore and to suit the technical requirements of the rapidity and the economy in yield of the process. Without consideration of the latter, the addition of quick lime may even be under 0.5% of the pure spodumen. For the same duration of operation the lithium extraction yield, which is 100% for a calcined product with 10% addition of lime, falls to 84% for a calcined product with 2.5% addition.

The theoretical equivalent of quick lime which would take the place about the lithium oxide would be ca. 15% quick lime based upon pure spodumen. This corresponds to the theoretical formation of an aluminous metasilicate of lime.

On the other hand the dimensions of the calcination and extraction apparatus must be increased in nearly the same proportions as an addition to the spodumen of quantities of lime over 25% or even over 50% is used, on account of the increased masses to be treated. The limit of addition of lime in the new process is overstepped with a 100% addition to the pure spodumen, the calcined product being then sufficiently soluble in pure water, to allow the extraction by pure water of its lithium content.

In the known extraction processes with water, of calcined products of spodumen and lime, such as that of Rosett and Bichowsky (U. S. Patent No. 2,020,854) the masses treated comprise in admixture one part of lithium ore to at least 2 to 2.7 parts of limestone, equivalent to 112 to 151% addition of quick lime to a technical spodumen titrating 28% of impurities. Although a maximum addition of 1.5 parts of calcium carbonate or of ¾ of a part of oxide for one part of mineral may be made, an addition of oxides amounting to 5 to 10% of the mineral is sufficient and is preferred.

The chemical similarity between the oxides liberated by the action of heat from compounds which belong to the alkaline earth substances, makes it possible to replace the addition of lime to the spodumen for the calcination of the mixture, by other members of the same group, such as oxides, hydroxides or salts derived from an oxy-acid. One may calculate the amount of oxy-acid in exchange for lime, holding the same limits of the proportions as used with the pure spodumen.

As compounds by which quick lime may be replaced in the mixture, there may specially be named slaked lime, limestone or calcium carbonate, dolomite, magnesium oxide, calcium sulphate, sodium carbonate, sodium sulphate, a plurality of which may also be mixed with spodumen, to react therewith during calcination. With the addition of calcium sulphate, alone or together with lime, before calcination, with spodumen, it is again the small quantity of the total addition of alkaline earth oxide, which distinguishes over the processes known heretofore. In the known processes, a calcined product is produced in which silicic acid is in the state of saturation, as orthosilicate of lime and the lithium as a soluble compound in pure water.

It is very important to note that the addition to the spodumen of small quantities of oxides, belonging to the group of the oxides of the alkali-metals or alkaline earth metals must be effected before the calcination of the mixture and that a certain chemical reaction must take place to a greater or lesser extent, between the constituents during calcination, in order to alter the chemical constitution and the specific mineral nature of the spodumen. If on the contrary the spodumen were calcined alone, in the pure state and if the oxides of the same nature were added to the aqueous lixiviation solution, for instance, a small amount of burnt quick lime, to the mother liquor of sodium chloride the reaction would be nothing more than an accommodation of the pH of the dissolving liquid, at its most favorable degree of reaction. In the present process the pH is not a critical factor, since the dissolving liquid may be acid, neutral or alkaline.

The calcined spodumen with small quantities of alkaline earth oxides may acquire a certain amount of hydraulic properties, although this is not a necessary feature of the process according to the invention and the effect is somewhat like that encountered in the hardening of Portland cement, though to a much lesser degree. As in cement, the presence of some electrolytically dissociated salts favors the rapid hardening of the pulp, especially if heated beyond 100° C. under pressure. Due to the coagulation the dissolving action of the saline solution may be seriously hampered and it is advisable and even sometimes necessary to stir up the mass in the autoclave.

The disadvantageous effect of hydraulicity after calcination is largely compensated by the rapidity of the reaction of the spodumen reacted with the small addition of the oxide as above. At a sufficiently high temperature in the autoclave, the hydraulic reaction may take place almost immediately and if performed under continual stirring of the pulp the coagulation of the mixture is avoided and its lithium content is rapidly dissolved into the saline solvent so that the leaching is rendered substantially complete and irreversible.

In this manner, the low hydraulicity, caused by the calcination of the spodumen mixed with a small amount of lime, and the chemical reaction of the mixture, is followed by the rapid digestion of the calcined product which is rather inert in pure water, by the ionizing action of the saline solutions.

Since the spodumen is contaminated by the absorption of alkaline reacting lime during the calcination, there is a tendency for the free silicic acid formed by the water treatment and hydrolysis of the calcined ore to produce a permeable coating about the calcined ore particles. In the presence of alumina which is contained in the ore, the alkaline lime silicate and alumina interact to form a hydraulic composition which coats the calcined ore particles during the water treatment and the hydraulic composition hardens in a similar manner as does cement. The presence of the leaching electrolyte in accordance with the invention in the water used for treating the calcined ore counteracts the tendency of the calcined ore to become transformed into this hydraulic state and by appropriately stirring the aqueous leaching solution containing the electrolyte, the formation of the hardenable surface coating is completely avoided.

The temperature at which the reaction between the lime and the spodumen is conducted need not be accurately fixed, since, as in the case of the dissociation of calcium carbonate, there is a chemical equilibrium, which varies with the increasing temperature and time of treatment and depends also on other factors such as size of the grains of each constituent of the mixture, its previous state of density, the crystalline or amorphous nature of the lime and impurities, etc. In all cases it is found that the phenomenon of the partial or complete fusion of the mixture, is a sure sign that the reaction is complete.

This does not mean that the mixture must in all cases be heated to its slagging or its sintering temperature, since the optimum calcination temperature is determined for the constituents by making a test run. However, complete sintering facilitates the rapid extraction of the lithium compounds and the consequent high yield. It is found that long before the first signs of fritting of the mass, that is at about 700° C., the lime begins to react with the spodumen, which itself tends to be transformed at a higher temperature to its so-called beta variety, and to crumble to a very fine powder. If afterwards the interpenetration of the particles is not pushed too far by slagging or fritting and the calcination is suitably interrupted the mass may be kept in a very pronounced pulverulent state which is a state of very feeble cohesion. Thus the expense of a further fine grinding can be obviated and the mass is prepared in a far better physical state to undergo the chemical reactions of subsequent digestion. The partially or completely fused mass thus exhibits a chemical and physical state which is more stable and which permits a slower and complete extraction to be obtained.

An accurate control of the best temperature of calcination depends partly upon the choice of the proper furnace for that purpose. There exists today well fitted furnaces for metallurgical agglomeration of ores and these may be used for fritting the mixtures of spodumen and lime in various proportions and a light agglomeration is obtained between 1000 and 1300° C. This operation will be easy, rapid and sure in its results.

The calcined mass is then rapidly cooled, and if necessary again finely pulverized. The calcined mass has some tendency to decompose in hot water, but the lithium cannot be sufficiently dissolved, even under pressure, without the use of leaching anions of acid radicals, for example solutions of alkaline or alkaline earth salts and generally at a temperature of over 100° C. under super-atmospheric pressure.

Under a pressure of 20 atmospheres with a corresponding boiling temperature of nearly 210° C., a solution in water of sodium chloride as a solvent readily effects the extraction of the lithium compounds. At a higher pressure, e. g. 90 atmospheres at 300° C., the advantage of immediate extraction is obtained. The conditions are still better at a temperature of 400° C., but then a heavy autoclave is required.

The aqueous saline solution used to decompose the calcined product may comprise any water soluble metal salt, but is preferably a salt with an alkaline cation of the alkali- or alkaline earth metals, without any regard to its acid, neutral or alkaline nature, the pH of the dissolving liquor not being critical. Excellent results are obtained with a solution in water, of sodium chloride, as well as with a water solution of neutral sodium sulphate, sodium or calcium nitrate or calcium chloride, or with a mixture of such salts. The rapidity of the reaction is favorably influenced by a higher concentration and also by a rise in the temperature.

In place of these salts in solution, an aqueous solution of free hydrochloric acid, or waste hydrochloric acid may be used.

The use of alkaline nitrate or sulphate, which have great solubility in hot water but are more expensive than sodium chloride, is not necessarily less economical, since all of the mentioned alkalis may be regenerated in the saline extraction solution, by a reagent such as sodium carbonate, which precipitates the lithium salt in sufficiently concentrated solution, whereas the acid radical returns to the sodium to regenerate the solvent. Lithium carbonate is formed, which is sufficiently insoluble to be separated by filtration, and the solution is regenerated to recover the sodium sulphate, or nitrate as well as the chloride and sodium carbonate is consumed.

A simple example of carrying out the process is the following: 100 parts of spodumen (calculated as the pure mineral) are intimately mixed with 20 parts of calcium carbonate (calculated at the pure state) in a wet grinder, by which these are at the same time reduced to a fineness corresponding to 100 mesh. The mass so obtained is mixed in any convenient manner with some water and a given percentage of solid fuel, for instance 6 to 10% of fine coke and then very lightly agglomerated by means of a Dwight-Lloyd fritting device with a moving grate, or in a Greenawalt-vat with fixed grate.

The calcination may also be performed—accompanied or not by agglomeration—without any addition of fuel to the mass, by simply heating in a rotary kiln, which is easily regulated.

When marked agglomeration (more or less complete fusion) has taken place, it is usually of advantage to grind the agglomerated or fused product to a fine state, after it has been suddenly cooled. The 111 parts of powdered calcine resulting from the initial mixture of 120 parts of spodumen and limestone are then suspended in water, to form a pulp. The pulp contains from about 20 to 50% of solids in suspension and the lixiviating electrolyte is in solution, preferably in a concentrated state. Thus the water used to form the pulp may contain, in solution, 39 parts of sodium chloride or 40 parts of anhydrous sodium sulphate to 100 parts of water. The pulp may be prepared in an iron vat provided with a stirring device.

The pulp is brought into an autoclave provided with an efficient stirring and mixing device and adapted for continuous operation. It is heated, for example, to 200° C., and the vapors evolved by the liquid phase are kept under a pressure of about 16 atmospheres, these conditions being maintained for a half hour, conveniently, without interrupting the stirring and thereafter the mixture is cooled. The pulp is then removed, decanted, filtered and washed with boiling water. The residue on the filter is practically free of lithium.

The filtrate is mixed at a boiling temperature, with a calculated quantity of concentrated solution of sodium carbonate in order to precipitate the very small quantities of impurities i. e. silico aluminate of lime. (This operation may also be performed directly with the pulp, when it comes out of the autoclave.) After filtration and light washing there is added, a further measured dissolved amount of concentrated sodium carbonate solution at a boiling temperature in order to precipitate the greatest part of lithium carbonate out of the saline solution. The filtered and lightly washed product is of a marketable industrial quality. The slight residue of impurities which separates, contains a small percentage of lithium and this may be added to the fresh spodumen before its calcination.

During the precipitation reaction there occurs at the same time the regeneration of the saline solution of sodium chloride or other salts by exchange of the alkali cation with the lithium salt in solution. Any deficiency in leaching electrolyte is compensated by an adequate addition of fresh salt (chloride, sulphate, nitrate or other sodium salt) and the solution together with the washing water is concentrated by evaporation to the required degree and is recycled to form new pulp. This example merely illustrates the new process, and it will be understood that as the method of separation of the lithium compounds out of the alkaline solution may vary, the nature of the products obtained may vary accordingly.

When the spodumen is calcined with normal sodium sulphate (and not with calcium carbonate or quick lime) the following particulars may be given as an example:

In place of 20 parts of calcium carbonate to 100 parts of pure spodumen, the chemical equivalent is added, i. e. 28 parts of anhydrous sodium sulphate, or an equivalent solution of this salt. While calcining that mixture, care should be taken to avoid any formation of sulphides, by avoiding the addition of solid fuel to the mass and by working with an oxidizing flame.

In the extraction autoclave there is used an electrolyte leaching solution which is likewise composed of sodium sulphate (though use may be made for example of a solution of sodium chloride) and, after filtration of the residue, the solution is regenerated by sodium carbonate, while precipitating the lithium carbonate to obtain the sodium sulphate required for the calcination, or at least a part of it, by drawing off an aliquot part of the regenerated liquid.

When the leaching electrolyte in the autoclave is sodium chloride, the sodium sulphate must be recovered by crystallization from the filtrate resulting from the precipitation of the lithium carbonate, said sulphate resulting from the reaction of the sodium carbonate with the lithium sulphate. To that end it is sufficient to cool the concentrated solution of the salts until crystallization of the sodium sulphate is completed, which latter is used for further calcination. The mother liquor is recycled with its content of sodium chloride without need to separate all the sulphate.

In place of the saline solutions for the dissolution of the lithium compounds out of the calcined product, use can be made of free hydrochloric acid in aqueous solution. While indeed the pure spodumen, calcined alone, is insoluble in a boiling concentrated solution of hydrochloric acid in water, the mixture of 100 parts of pure spodumen calcined with 10 parts of lime (for example) is soluble in that reagent.

In order to reduce the simultaneous dissolution of considerable quantities of silico-aluminate together with the lithium oxide, it is preferable to use only the smallest possible quantities of hydrochloric acid. It is also preferable to get rid in the filtrate of the residue of the spodumen and eliminate as much as possible the dissolved silicic acid and aluminate, by evaporating to dryness and by heating to about 350° C., in order to render those impurities insoluble.

From this second residue the lithium salt may be extracted with water.

The principal advantages of the new process as a whole, may be summed up as follows:

The crushing devices, pulverizers and calcination furnace plants may be reduced in their size and the cost may be cut in half as compared to the cost required by former processes. This also applies to the digestion and the extraction apparatus. Because the spodumen in the calcined mixture is chemically and physically altered in its individual crystallized nature and in its chemical composition by the chemical reaction at high temperature, the decomposition operation and the extraction of the lithium compounds in the solvent, are very rapid and may be conducted under a moderate pressure and at a relatively low temperature. Consequently the treatment in the autoclave is made easier. This permits reducing the size of the apparatus. The expense with regard to the reduced amount of mixture to be calcined, is lowered. The speed of the reaction of digestion is increased and an increased yield is obtained from the extraction, which latter is the total yield from an industrial point of view.

Having thus disclosed the invention what is claimed is:

1. A method of recovering lithium from its aluminum and silicate containing ores comprising mixing the ore with at least 2.5% but less than 100% of an alkaline compound selected from the group consisting of the oxides, carbonates and hydroxides of alkali metals other than lithium and the oxides, carbonates and hydroxides of the alkaline earth metals based upon the lithium mineral content of the ore, calcining said mixture at a temperature from about 700° C. upwards to at least partially fuse the mixture to obtain thereby a calcined product non-leachable with water, and thereafter leaching the calcined product with an aqueous leaching electrolyte other than lithium, said electrolyte being selected from the group consisting of hydrochloric acid, alkali metal chlorides, alkali metal sulphates, alkali metal nitrates, alkaline earth chlorides and alkaline earth nitrates to obtain the lithium salt formed in the aqueous leaching solution.

2. A method as in claim 1 wherein said alkaline compound is admixed with said ore in an amount less than 75% of said ore based upon the lithium content of said ore.

3. A method as in claim 1 wherein said alkaline compound is added to said ore in an amount from about 5% to 10% based upon the lithium content in said ore.

4. A method as in claim 1 wherein said alkaline compound combined by calcination with the lithium mineral is sodium oxide.

5. A method as in claim 1 wherein said alkaline compound combined by calcination with the lithium mineral is calcium oxide.

6. A method as in claim 5 wherein said calcium oxide is combined with the lithium mineral by heating the mixture of ore with a calcium oxide yielding material at a temperature between 1000 and 1300° C.

7. A method as in claim 1 wherein said leaching is conducted at a temperature between 100° C. and 400° C. within a closed vessel.

8. A method as in claim 7 wherein said calcined product and leaching solution is stirred during said leaching operation, the product and leaching solution forming a pulp in which the lithium ion of the calcined product is exchanged with the base metal cation of the electrolyte dissolved in said solution.

9. A method as in claim 8 wherein said leaching solution is separated from said pulp, the lithium in said leaching solution is precipitated with a solution of sodium carbonate and the filtrate recovered is recycled in the process for leaching.

ADOLPHE VICTOR KROLL.

References Cited in the file of this patent

UNITED STATES PATENTS

| Number | Name | Date |
|---|---|---|
| 836,781 | Poulenc | Nov. 27, 1906 |
| 2,020,854 | Rosett et al. | Nov. 12, 1935 |
| 2,021,987 | Colton | Nov. 26, 1935 |
| 2,021,988 | Corson et al. | Nov. 26, 1935 |
| 2,413,644 | Nicholson | Dec. 31, 1946 |